United States Patent [19]

Morrison, Jr.

[11] 4,161,267
[45] Jul. 17, 1979

[54] TRUNK MOUNT SPARE WHEEL CARRIER DEVICE

[76] Inventor: Frederick D. Morrison, Jr., 5741 Acres Rd., Sylvania, Ohio 43560

[21] Appl. No.: 803,780

[22] Filed: Jun. 6, 1977

[51] Int. Cl.² ............................................. B62D 43/02
[52] U.S. Cl. ............................ 224/42.24; 224/42.25; 248/225.3 R
[58] Field of Search ............... 224/42.24, 42.25, 42.12, 224/42.1 E, 42.1 R, 42.1 B, 42.1 D, 42.1 F, 42.06, 29 R, 42.2, 42.42 R, 42.45 R, 42.13, 42.3; 248/225.3, 226.1, 203, 503

[56] References Cited
U.S. PATENT DOCUMENTS

| | | | |
|---|---|---|---|
| 2,839,232 | 6/1958 | Homeier | 224/42.12 |
| 3,239,115 | 3/1966 | Bott et al. | 224/42.1 F |
| 3,349,977 | 10/1967 | Caminiti | 224/42.24 X |
| 3,823,857 | 7/1974 | Yandt | 224/41.12 X |
| 3,972,457 | 8/1976 | Kesler | 224/42.13 X |
| 3,990,618 | 11/1976 | Shattuck | 224/42.25 X |

*Primary Examiner*—Robert J. Spar
*Assistant Examiner*—Jerold M. Forsberg
*Attorney, Agent, or Firm*—Paul F. Stutz

[57] ABSTRACT

A spare wheel and tire carrier includes a base having depending cushion members for contact with the automobile rear deck lid, a connected upwardly extending receiver for a wheel rim, an adjustable securement mechanism carried by said receiver, straps connected to said base and adapted for releasable securement to said trunk lid by a threaded rod and yoke which adjusts the tension in said straps.

9 Claims, 5 Drawing Figures

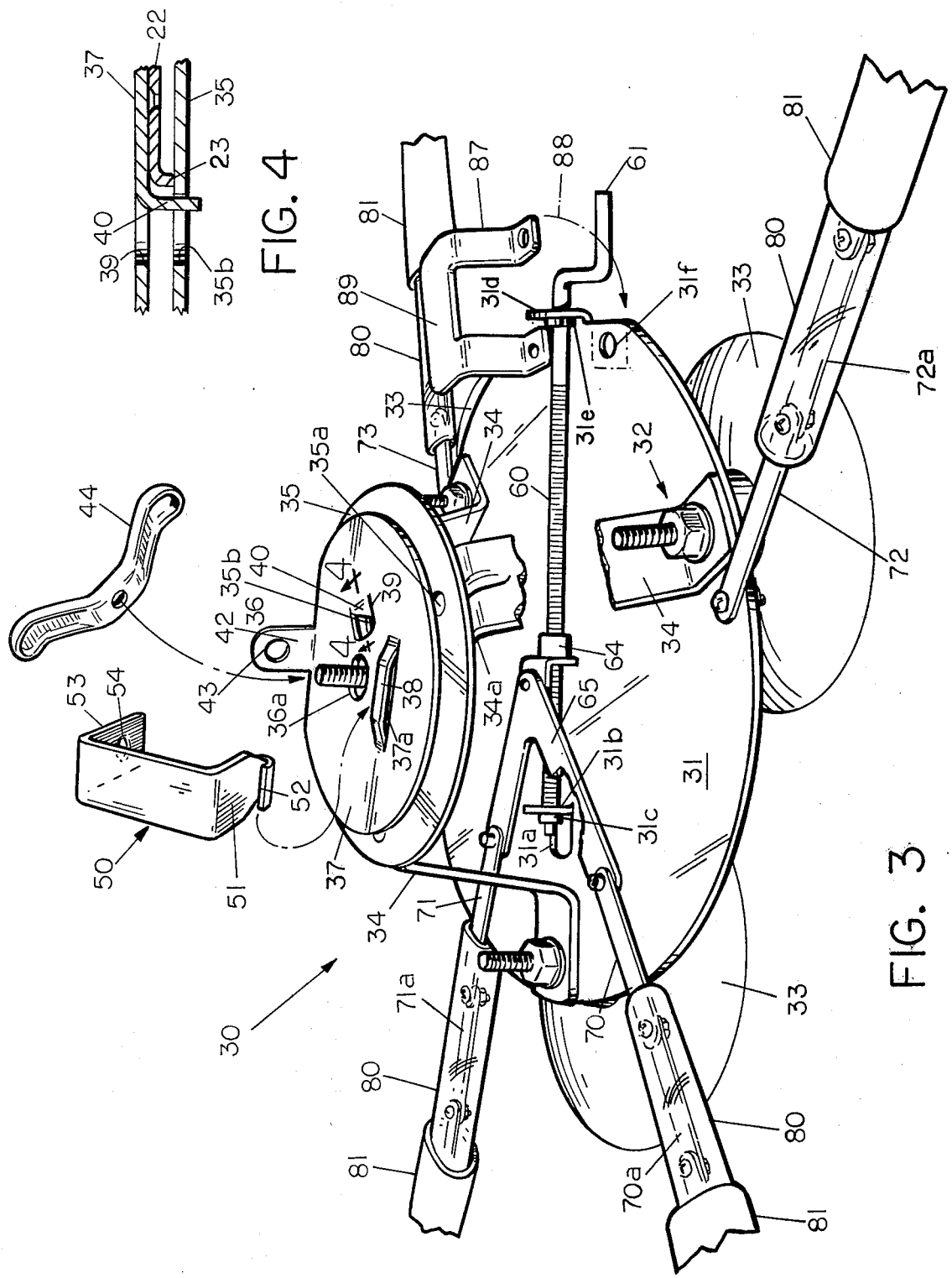

TRUNK MOUNT SPARE WHEEL CARRIER DEVICE

The present invention relates to a portable carrier device for a spare tire and wheel adapted to be removably mounted on the rear trunk lid of an automobile and carry said wheel and tire safely and securely.

Spare wheels and tires are most usually carried in the trunk of passenger cars which, of course, reduces the volume of the trunk by that of the wheel and tire and, of course, consequently reduces the amount of room available for storage of suitcases and other goods desirably carried therein. Conventionally, the tire is mounted on the wheel and the tire inflated in order that it may be deployed from the trunk store position and mounted as a replacement for a flattened or deflated tire and/or damaged wheel or rim. On certain commercial vehicles, spares are carried underneath the frame between the rear wheels. Other mechanisms and arrangements are known for mounting the spares proximate the hood and fender region in a position normal to the bed frame of the vehicle.

Some devices for carrying the tire on the trunk lid are known in the art including those disclosed in U.S. Pat. Nos. 3,823,857; 1,506,977; 2,839,232 and 3,349,977. The structures disclosed in these prior art patents are possessed of a number of shortcomings, however, which have adversely affected their market acceptance to any significant degree. For the most part, these known carrier devices are of quite complicated and cumbersome design, are composed of a large number of parts and strain ability of the average person to assemble the parts together when properly and securely on the vehicle for the intended purpose. The devices referred to are also inclined to lack the flexibility and adjustability as to provide that universality desirable and necessary for widespread adoption by the purchasing public. Some of the shortcomings and drawbacks, of course, are directly reflected in a higher cost than acceptable by the trade.

It is an overall object of the present invention to provide a carrier device which overcomes the defects and shortcomings of the carrier devices known heretofore.

It is principally an object of the present invention to provide a carrier device which is securely fastenable to the vehicle, is capable of carrying a wheel and inflated or deflated tire combination and which makes available the trunk space for full utilization and storage of items desirably so stored by the vehicle user.

It is also an object of the present invention to provide such a device which is lightweight, portable, relatively simple and easily mounted and demounted in order to permit usage as conveniently desired.

It is still another object of the present invention to provide such a tire rim carrier device which is easily attached to the vehicle, and specifically the rear deck, without injury to the vehicle without modification; the mechanism for securement being inherent in the design of the portable wheel carrying device.

It is yet another object of the present invention to provide a wheel carrier device which includes features of tensioning adjustment as lend flexibility to the range of size of wheels, of vehicles and of rear deck lids which can be accommodated by the singular device of the present invention.

It is still another object of the present invention to provide such a device which features several locking mechanisms integral with the device which thereby augment the security of the wheel and tire on the device, although exteriorly mounted, and which additionally augment the security of the device as mounted on the vehicle.

It is a particular object of the present invention to provide a device which is composed of a minimum number of parts which are interrelatedly designed as to be adapted for packaging, shipment and marketing in disassembled kit form and yet being easily reassembled with a minimum of difficulty and with a minimum chance of error or mistake to yield a sturdy, secure and reliable carrier device possessed of a wide latitude of utility with respect to the size of the deck lid to which it is to be attached and for accommodating different size of wheels.

The foregoing as well as other objects of the present invention will become apparent to those skilled in the art from the following detailed description taken in conjunction with the annexed sheets of drawings on which there is presented, for purpose of illustration only, a singular embodiment of the present invention.

IN THE DRAWINGS:

FIG. 3 is a perspective, partially schematic view of the device of the present invention with its relative parts shown somewhat disassembled and with parts broken away for clarity of illustration;

FIG. 4 is a sectional view taken on the line 4—4 of FIG. 3, but with a wheel present, and serves to show a particular lock feature of the present invention.

In its simplest embodiment, the wheel/tire carrier of the present invention contemplates a base plate having secured thereto a plurality of depending rubber-like cushion legs; said plate bearing a journally mounted threaded crank arm connected with segmented straps extending in opposite directions for hook engagement with the trunk lid, said base plate supporting an upstanding structure adapted to receive the rim of a tire; said device further including a lock plate cooperating with the upstanding structure to secure the wheel and, most desirably, including separable locking brackets for the lock plate and also for the crank arm.

Figure 1:
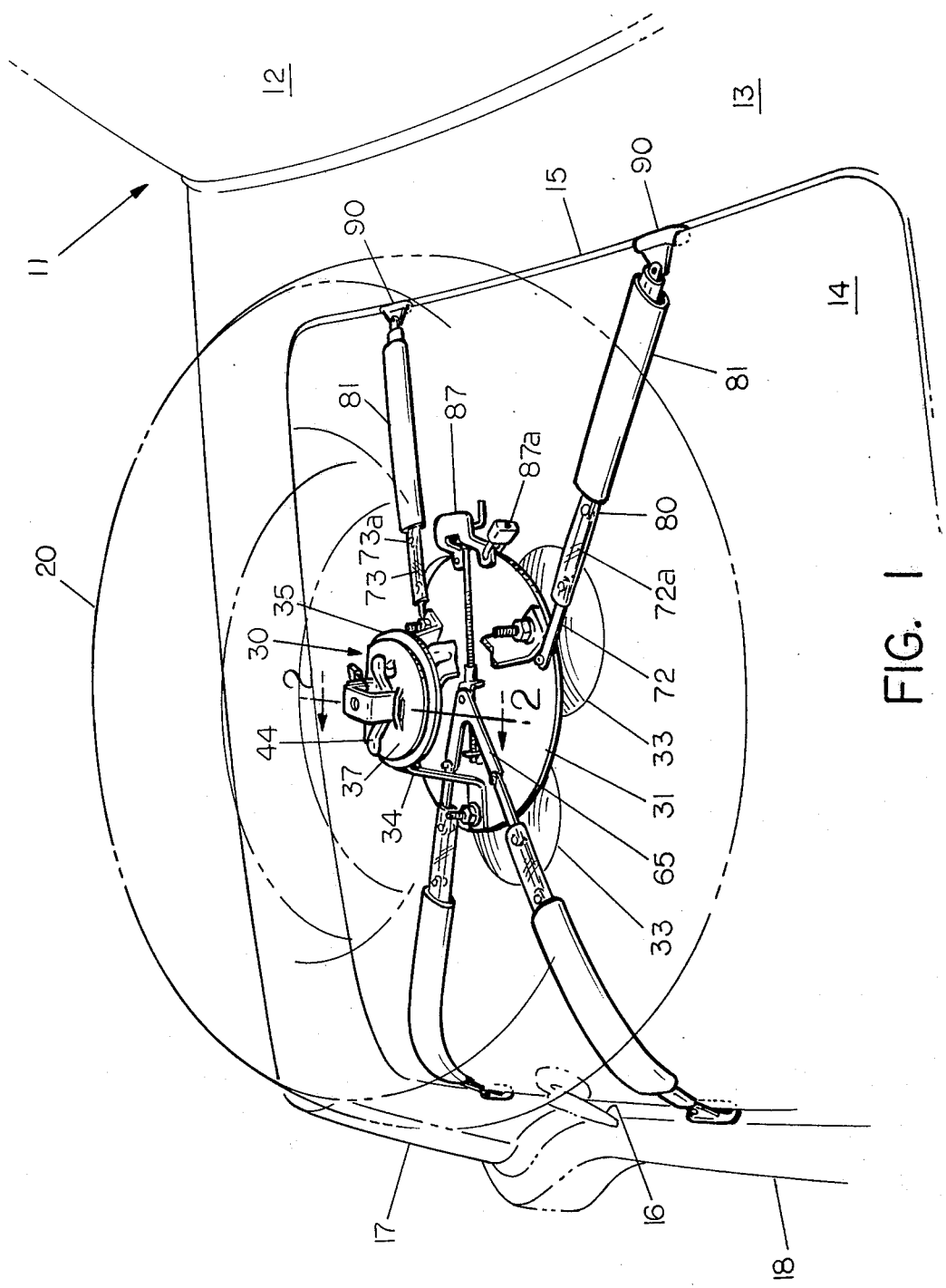
FIG. 1 is a side perspective view, somewhat from above, showing the structure carrying a tire and wheel on the rear deck trunk lid of a vehicle.

The above-described objects and features of advantage will be more clearly understood by reference to the following more detailed description and to the drawings, and particularly to FIG. 1, wherein there is shown an automobile 11 having a rear window 12 and a rearwardly extending deck 13 inclusive of a trunk lid 14 hinged along its upper edge 15 about which the trunk lid pivots when raised via manipulation of the handle 16 situated in the center of the trunk 14 and spaced from the rear taillight 17; that is, laterally therefrom and above the rear bumper 18. Situated above the trunk lid and carried by the device 19 is a tire identified by the reference numeral 20 mounted upon a suitable rim 21 (see FIG. 2). The rim includes a central, generally circular spider section 22 terminating at its central region in an annular hub flange region 23 surrounding a central hub aperture 23a adapted to receive the endmost extremity of the axle when the wheel is mounted operatively on the automobile. The spider, for reference purposes, includes a plurality of radially spaced apertures identified by the reference numeral 24 which engage the lugs when operatively mounted on the automobile and are secured thereto by lug nuts as is well known in the art.

The device 30 of the present invention is shown most clearly in FIG. 3 and includes a circular base plate 31 which has bolted thereto, in height adjustable fashion as at 32 and depending on the underside, three radially spaced rubber suction cups 33. Each of the nut and bolt sets 32 carrying the suction cups therebeneath also serve to secure the lower flanges of three inwardly and angularly upstanding struts 34; the foremost one in FIGS. 1 and 3 being broken away. The three struts 34 each include an upper flange 34a which, in aggregate, support a circular support disk 35 parallel with the base plate 31 and rivet-connected to the flanges 34a (see reference numeral 35a), although nut and bolt fastening can be used. A large bolt 36 (see FIG. 2) projects upwardly through an aperture located centrally of the disk 35 and is spot welded to the disk 35. The bolt 36 extends upwardly through central aperture 36a in a locking plate 37 where a wing nut 44 threadingly engages the bolt 36. Continued rotational tightening movement of the wing nut 44 urges the lock plate 37 into flush compressment of the spider and flange region 23 against the upper surface of the support plate 35. Tightening of the wing nut thus firmly secures and compresses the rim between these two plates 35 and 37. One of the locking features of the present invention is provided by an offset aperture 35b in support plate 35 (see FIG. 4) which is adapted to receive integral tongue 40 which is deflected downwardly of locking plate 37 via the U-shaped cut 39. With the tongue 40 projecting downwardly through the aperture 35b as shown in FIGS. 3 and 4, any rotation of the locking disk 37 is prevented. In addition to the cut 39, there are parallel spaced cuts 37a which allow an upward displacement of the region inbetween to define a slot 38. Lock plate 37 includes upstanding marginal ear 42 provided with a central aperture 43. The slot 38 and aperture ear 42 serve with the generally inverted U-shaped bracket or lock member 50 to prevent rotation of the wing nut. As can be seen, the lock member 50 includes a depending leg 51 having a hook-shaped extremity 52 for engagement with slot 38 and a depending leg 53 having a central aperture 54 which is adapted to align with aperture 43 in ear 42, thereby preventing rotation of applied and tightened wing nut 44.

Base plate 31 includes an off center U-shaped cut 31a which allows upward deflection of an upstanding ear 31b in which is mounted a journal-type fitting 31c. The base plate 31 also includes a marginal upstanding ear 31d having a central journal-type fitting 31e in spaced axial alignment with the journal fitting 31c and together rotatably carrying a threaded rod 60 having an offset crank end 61 located beyond the edge of the base plate 31 and with the opposite end freely rotatable in journal fitting 31c. The threaded rod 60 carries an internally threaded sleeve 64 riveted to a yoke 65 which moves along the rod 60 as the crank arm 61 is cranked. The threads are, of course, an endless wedge, serving to move the yoke and thereby adjusting the tension in the two straps connected thereto. Each leg of the yoke 65 connects with a short length of metal strap; one being designated 70 and the other 71. Each strap length is removably connected to the yoke leg by a nut and bolt as shown and, similarly, each of these lengths 70 and 71 connect with a similar length of metal strap, 70a, and 71a, at their respective end extremities. Any suitable number of such lengths are connected in turn, such as four or five, to define, in aggregate, a suitable length. Hollow lengths of tubing 80, desirably transparent, telescopically surround each linear array of metal strap elements such as 70 and 70a, while larger rubber-like tubes 81 embrace the lengths of transparent tubing 80. Two additional sets of lengths 72, 72a and 73, 73a are connected by nut and bolt to the base plate 31 and extend generally oppositely to the yoke-connected lengths 70, 70a and 71, 71a. The linear sets 72, 72a and 73, 73a are also surrounded by an elongated piece of preferably transparent tubing 80 and, similarly, a somewhat larger piece of tubing 81. The end extremities of the four sets of segmented metal straps 70, 71, 72 and 73 terminate with a hook-like fitting identified by the reference numeral 90 which grasps the upper edges and lower edges of the trunk as shown in FIG. 1. The segmented straps 70, 71, 72 and 73 are connected end to end by nut and bolt connections as shown to permit varying lengths to be prepared to accommodate the size of the trunk lid associated with the particular make of the automobile and to allow flexibility but precluding, at the same time, any lengthening under load except by operation of the crank and yoke. The larger tubes 81 serve to prevent vibration of the wheel as the automobile upon which the device is mounted is moving over varying road conditions. To this end, the tubes 81 should be of sufficient size to cushion, insulate and separate the side wall of the tire from contact with the trunk lid surface. The tubes 81 also serve as a spacer insulator as between the segmented straps enclosed in the transparent tubes 80 and the surface of the deck lid.

In accordance with one aspect of the present invention, the device of the present invention would be marketed as a kit of disassembled pieces as described. In unassembled condition, the plurality of individual parts can be located in a relatively small shipping and display container formed of corrugated paperboard or chipboard together with a suitable set of instructions and drawing of how the various parts can be put together for use as a spare wheel and tire carrier device of the present invention.

The base plate 31 desirably includes a pair of spaced marginal apertures 31f on either side of the upstanding ear 31d, with a locking U-shaped bracket 87 pivotably connected to one of said apertures and thereby movable between an open position as shown in FIG. 3 and closed position in FIG. 1. In the latter, bracket top 89 would preclude rotation of the crank end 61 of threaded rod 60. A lock 87a secures the bracket in the closed position.

Figure 2:
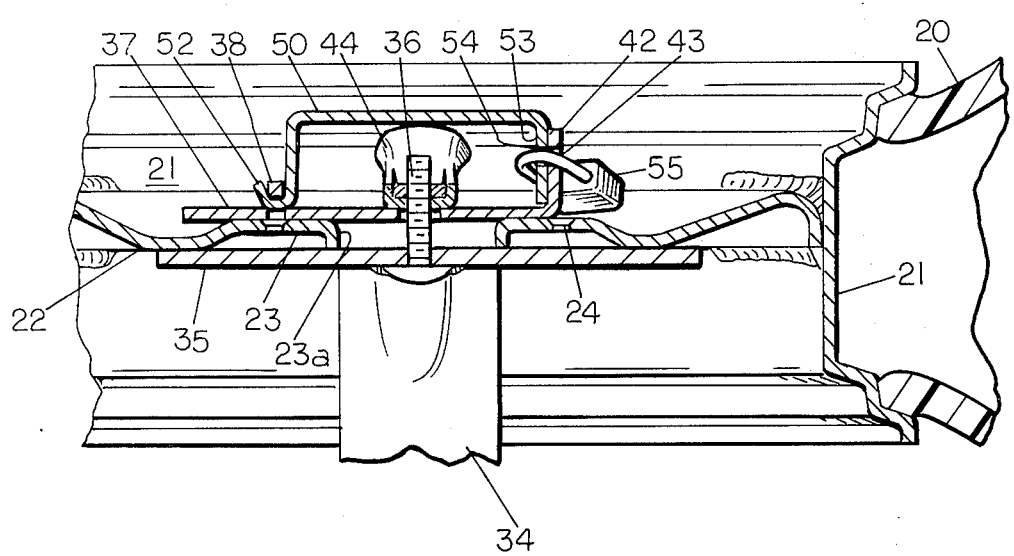
FIG. 2 is a sectional view taken on the line 2—2 of FIG. 1.

From the foregoing, it will be appreciated that the base plate 31, the struts 34, the support plate 35 and the suction cups 33 may be readily assembled into the configuration generally shown in FIG. 3 together with the crank rod 60, the yoke 65 and the segmented straps, with their hook ends 90 engaging the respective edges of the trunk as shown in FIG. 1. The structure is then laid on top of the trunk lid with some positional adjustment by operation of crank arm 61 so that the tension in the four sets of straps is generally equalized. Next, downward pressure on the base plate 31 will cause the suction cups to engage the upper surface of the deck lid and thusly secure the structure to the deck lid. The combination of the four lengths of metal straps, the crank arm tensioning thereof and the suction cup engagement provide a secure attachment of the device to the trunk lid. Following this securement, the wheel itself can be lowered onto the support plate 35 as shown in FIG. 2, with the central flange region 23 of the rim coming to rest on the upper surface of support plate 35, with the upstanding threaded bolt 36 centrally located with respect to the central hole or aperture 23a in the spider rim. Next, the locking plate 37 is centered down about the upstanding bolt 36 as shown in FIG. 3, with the depending tongue 40 radially disposed to penetrate aperture 35b in the support plate 35. This is specifically shown in FIG. 4. It will be appreciated that the tongue 40 extending through this aperture will prevent rotation of the lock plate 37. The wing nut 44 is then threaded onto the bolt and tightened, compressing the spider rim between support plate 35 and locking plate 37. Finally, the inverted U-shaped member 50 (see FIG. 3) is manipulated so that its hook end 52 is inserted into the slot 38 and with the leg 53 in parallel flush relationship with the upstanding ear 42 and with the apertures 43 and 54 in substantial registry and available for insertion of a padlock 55 therethrough to secure the rotation. Wing nut removal is necessary before the lock plate can be removed and, clearly, the lock plate must be removed before the wheel can be removed.

The carrier device 30 is itself locked securely onto the trunk lid via the locking member 87 which prevents rotation of the crank handle 61 necessary to loosen the tension in the strap connectors which are hooked onto the trunk lid edges. The unyieldable straps also prevent any movement of the base plate as might break the suction securement.

By way of further explanation, if desired, the wheel and tire can be removed by removing the padlock 55, the lock member 50, the wing nut 44 and finally the lock plate 37. If the carrier device itself is desirably to be removed from the trunk, the padlock 87a must be removed and the lock member 87 pivoted as in FIG. 3; following which, the crank arm can then be cranked in counterclockwise fashion, causing the sleeve 64 to move away from the crank, thereby loosening the tension in the straps connected to yoke 65. This will permit the strap hook ends 90 to be disengaged at the bottom edge of the trunk; following which, the suction cup engagement with the trunk lid can be broken. Finally, the upper hook end connectors 90 of the straps 72 and 73 can be disconnected, allowing complete removal of the device. The tubular members 80 and 81 around the four strap connectors protect the trunk lid against scratching by the nut and bolt connectors at the segmented ends of the separate lengths 70, 70a, 71, 71a . . .

Figure 5:
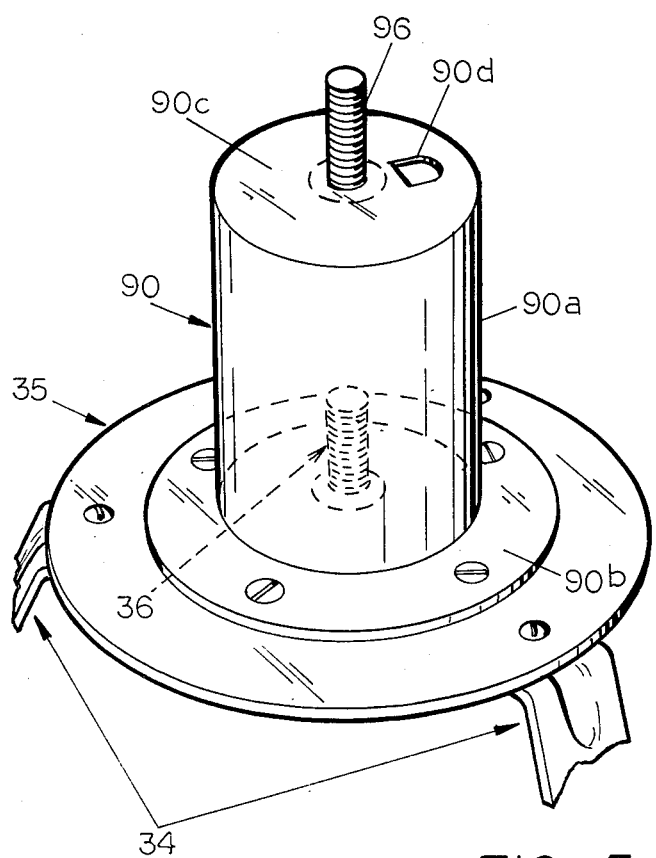
FIG. 5 is a perspective view of an adaptor device for a particular type wheel, specifically a sport rally wheel having a deep hub construction.

In FIG. 5, an adapter 90 is shown mounted on the carrier device to provide capability for carrying a sport rally wheel characterized by its deep hub construction. The adapter 90 is composed principally of a hollow elongate cylindrical portion 90a, a lower flange 90b and an upper horizontal end wall 90c. The flange 90b is adapted to be flushly located on the upper surface of the lock plate 35, previously described as secured to angularly upstanding struts 34 which, although not shown, connect to the base plate 31. The flange region 90b is secured as shown by three radially spaced nut and bolt connectors to appropriately apertured lock plate 35. The adapter structure 90, being hollow, accommodates the upstanding bolt 36 secured to plate 35 and is otherwise nonfunctional when the adapter 90 is used. A similar upstanding bolt 96 is spot welded to the upper end wall 90c of the adapter. The upper horizontal end wall 90c is also provided with a punched-out aperture 90d, like the punched-out hole 35b in lock plate 35. This punched-out hole accommodates the downwardly projecting tab 40 of lock plate 37 which is employed in this embodiment after the rally sport wheel is located with its deep hub construction telescopically about the upwardly projecting adapter and with the central region of the rim supported on the upper surface 90c of the adapter 90. Since the location of the lock plate, the U-shaped clamping or lock member 50 and wing nut 44 is otherwise as described in the embodiment of FIGS. 1-4, a full description will not be repeated here. In this embodiment, the deep portion of the rally wheel hub is facing downwardly towards the plate 35 or, in other words, downwardly towards the trunk lid. It is worthy of mention that this is in contrast to the embodiment of previous FIGS. 1-4, wherein the wheel, and specifically the rim, is mounted in such fashion that the concave part of the rim faces upwardly. Stated in another way, in the structure as shown in FIGS. 1-4, the white sidewall portion of the conventional wheel and tire is facing downwardly towards the trunk surface. This arrangement permits the device to be designed having a smaller overall size, thereby reducing materials and cost.

The device of the present invention as described, and particularly embodying the relative proportioning of the various components, accommodates different sized tire rims. The metal parts, principally the base plate 31, the support plate 35, the lock plate or disk 37, the lock member 50, the lock member 89, the yoke 65 and the flanged support brackets 34, are desirably formed of relatively inexpensive ⅛ inch thickness cold rolled, low carbon steel. Zinc plating of the metal parts lends resistance against moisture and rust. The device is relatively lightweight and compact and the parts are of relatively simple design and readily assembled by one of extremely limited mechanical ability. A screwdriver and a pair of pliers or a crescent wrench would permit the assemblement of the various parts together if acquired by the user in unassembled kit form.

The threaded nut and bolt connectors 32 which secure the suction cups 33 to the base plate 31 also allow considerable flexibility in adjustment of the height of the base plate above the upper surface of the trunk lid.

From the foregoing description of the constructional details and the recitation of the functional features of advantage, it will be appreciated that a variety and number of modifications, changes and substitutions would be obvious and consequently it is intended that all such are included within the scope of the present invention, unless they would do violence to the language of the appended claims.

I claim:

1. A spare wheel carrier for releasable securement to an automobile trunk lid having perimetric edges surrounding an upper surface, said wheel having an inner annular hub flange region, said carrier comprising:
a base member having depending means adapted to rest on the upper surface of said trunk lid,
an upstanding central support means, connected to said base member, having an upper horizontal face, adapted to flushly support said wheel on said inner annular hub flange region,
a lock plate adapted to rest on the other side of said annular hub flange region, means for urging said support means face and lock plate together to thereby compressingly secure said hub flange region therebetween, a plurality of elongate flexible holding straps secured at one end to said base member, said straps extending without entanglement or interference with said spare wheel to releasably engage said perimetric edges.

a yoke to which two of said plurality of said straps are connected and means for affecting movement of said yoke and consequent adjustment of the tension in said two straps.

2. A spare wheel carrier as claimed in claim 1 which includes a threaded fitting carried by said yoke and a threaded crank arm journally mounted on said base member, said crank arm threadingly engaging said threaded fitting, whereby cranking actuation of said crank arm will cause said fitting and connected yoke to move along the threaded crank to thereby tighten or loosen said straps.

3. A spare wheel carrier as claimed in claim 2 which includes lock means for preventing rotation of said crank arm.

4. A spare wheel carrier as claimed in claim 1, wherein said central support means comprises a generally circular plate and three bracket connectors connected to the underside of said circular plate and to the upper surface of said base member, said circular support plate having an aperture therein and said lock plate including a depending projection adapted to penetrate said opening and, when so positioned, precluding rotational movement as between said lock plate and said support plate.

5. A spare wheel carrier as claimed in claim 4, wherein said means for urging comprises a threaded bolt secured to project upwardly from said support plate beyond said lock plate and a wing nut threadingly engageable with said bolt to move said lock plate towards said support means plate, compressing said hub flange region therebetween.

6. A spare wheel carrier as claimed in claim 5 which includes a bracket removably securable to said lock plate in a position preventing rotation of said wing nut, thereby precluding removal of said lock plate or said wheel.

7. A spare wheel carrier as claimed in claim 6, wherein said bracket comprises a U-shaped member having releasable engagement means on each leg for engagement with complementary portions of said lock plate, said U-shaped member embracing said wing nut when engaged and precluding rotation thereof.

8. A spare wheel carrier, as claimed in claim 2, wherein each of said straps comprise a plurality of individual lengths of metal, releasably connected at their end extremities to adjacent length and a transparent sleeve member surrounding said lengths.

9. A spare wheel carrier, as claimed in claim 8, wherein said straps include a second shorter sleeve surrounding said first sleeve and insulating said straps from said trunk lid and cushioning same from said spare wheel side wall.

* * * * *